No. 675,199. Patented May 28, 1901.
J. O. DINKINS.
CULTIVATOR.
(Application filed July 31, 1900.)
(No Model.)
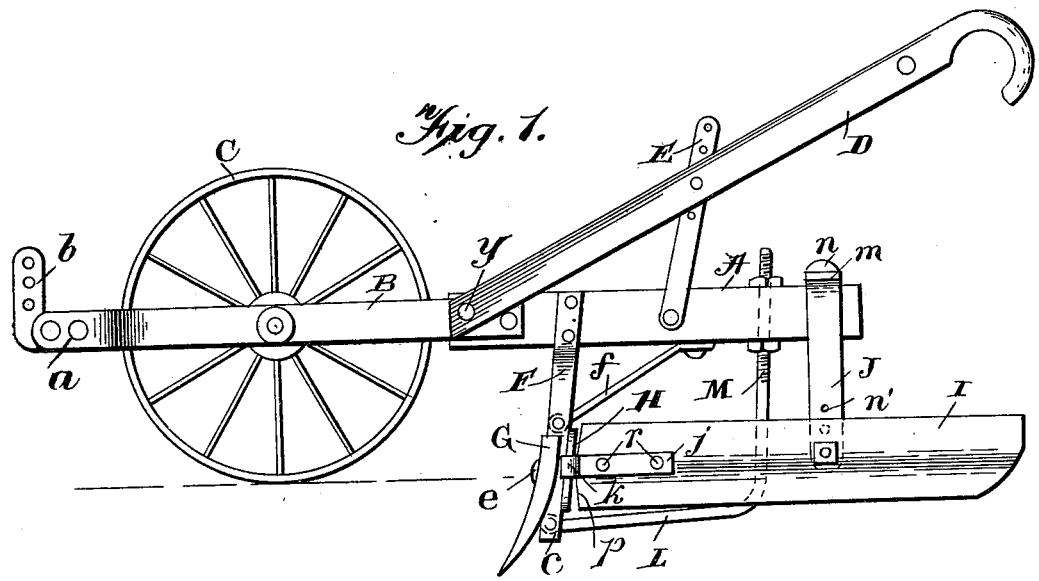
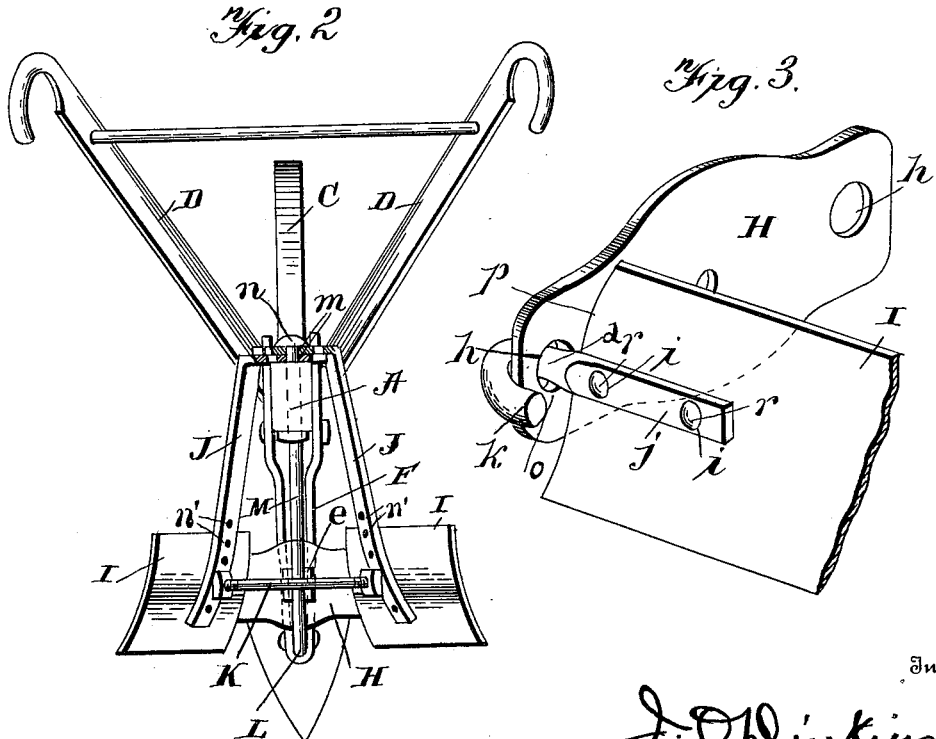
Witnesses
Geo. E. Frech.
Chas. R. Wright Jr.
Inventor
J. O. Dinkins
By A. S. Pattison, Attorney
THE NORRIS PETERS CO., PHOTO-LITHO., WASHINGTON, D. C.

UNITED STATES PATENT OFFICE.

JAMES OSCAR DINKINS, OF HEGAR, TEXAS.

CULTIVATOR.

SPECIFICATION forming part of Letters Patent No. 675,199, dated May 28, 1901.

Application filed July 31, 1900. Serial No. 25,437. (No model.)

*To all whom it may concern:*

Be it known that I, JAMES OSCAR DINKINS, a citizen of the United States, residing at Hegar, in the county of Waller and State of Texas, have invented new and useful Improvements in Cultivators, of which the following is a specification.

My invention relates to improvements in cultivators, and pertains more particularly to that class known in the art as "shovel-plows," which have rearwardly-extending wings or moldboards.

One object of my invention is to provide a cultivator which is adapted to cultivate between the rows of corn, &c., and one in which the rearwardly-extending moldboards can be adjusted in or out toward the beam, so that it can be used in case the rows are close together or far apart. The cultivator is also arranged so that the depth of the furrow can be regulated.

Another object of my invention is to provide a cultivator in which the moldboards are not only adjustable inwardly toward or from the beam, but are also adjustable up and down, so that the depth to which the moldboards are intended to enter the ground can be regulated thereby.

In the accompanying drawings, Figure 1 is a perspective view of my cultivator. Fig. 2 is a rear elevation showing the blades slightly spread apart. Fig. 3 is a detached sectional view showing the means of attaching the forward end of the moldboard to the cultivator.

Referring to the drawings, A represents a beam which has secured on either side forwardly-extending arms B, said arms having their forward ends drawn together at $a$ and between which is pivoted the clevis $b$. Between the arms B is journaled a wheel C, which is adapted to roll on the ground and make the plow easier to operate. The forward ends of the handles D are pivotally connected to the forward end of the beam A by the bolt $y$, which also secures the forwardly-extending arms B to the beam. Secured to the rear of the beam A are upwardly-extending bars E, which have at their upper ends a series of perforations by means of which the handles are held in the desired position.

A yoke F is adapted to straddle the beam A just in the rear of the handles and clamped thereto by bolts. The yoke has its lower end terminating in a shank $c$, which has a central opening. To the forward part of said shank is secured a plow-point G, which has a bolt $e$ passing therethrough and also through the opening in the shank $c$ of the yoke. A plate H is placed at the rear of the shank $c$ and has a central opening therein. A bolt $e$ passes through the plow-point and the opening in the shank and through the plate H, and thus the same bolt serves the two functions of securing the plow-point to the yoke and also the plate H. Secured to the under face of the plow-beam is a brace $f$, the lower end of which is secured to the shank of the yoke. The plate H is elongated and is provided at its ends with openings $h$, by means of which the moldboards are secured thereto.

The bars $j$ have their outer ends contracted and rounded, as shown at $d$, and then bent in the form of a ring $k$, said ring having an opening $o$, by means of which the said bars are attached or detached from the plate by swinging them parallel therewith. The rear ends of the bars are flat and provided with bolt-openings $i$, adapted to receive bolts $r$, which also pass through the moldboards, and adapted to receive nuts on the inside adjacent the moldboards, whereby the bars are securely fastened thereto.

The moldboard I has the portion adjacent the plate H beveled, as shown at $p$, and the contracted rounded portion $d$ being of less size than the opening $h$ will allow the moldboard to have a vertical movement, as well as a horizontal movement, or, in other words, forming a universal joint. The outer ends of the moldboards are attached to perpendicular standards J, which have their upper ends bent at right angles thereto, as shown at $m$, said portion having a series of openings through which the bolt $n$ passes and by means of which the moldboards can be adjusted horizontally. The bars have a series of openings $n'$ near their lower ends, the moldboards having openings to correspond therewith. A horizontal brace K has its end projecting through the openings in the vertical bars and the openings in the moldboards and nuts thereon on either side of the bars and moldboards for locking the moldboards against any possible movement. The forward end of the footpiece L is pivoted in the shank c, and the rear portion is bent upward, forming a vertical bar M, which extends through an opening in the beam A and is vertically adjusted by means of a nut on both sides of the beam.

The moldboards are adjusted in and out by removing the bolt n and inserting it in a new series of openings in the horizontal portion of the standards J, and when it is desired to adjust the moldboards vertically remove the horizontal bar and insert it in a new series of openings i in the vertical portion of the standards.

Having thus described my invention, what I claim, and desire to secure by Letters Patent, is—

1. The combination with a plow, of moldboards having their forward ends universally connected to the plow, L-shaped standards having their upper horizontal portions adjustable on the beam and means for vertically adjusting the moldboards on the vertical portion of the standards, substantially as described.

2. A cultivator comprising a beam a plow-point attached thereto a plate secured to the rear of said point and provided with openings at either side, moldboards having their forward ends provided with hooked members adapted to enter said openings and loosely secured therein and means for vertically and horizontally adjusting the rear ends of said moldboards, substantially as described.

3. A cultivator comprising a beam, a plow-point attached thereto, a plate secured at the rear of said plow-point and provided with an opening, a bar having its forward end formed into a ring entering said opening, a moldboard having its forward end connected to the rear end of said bar and means for vertically and horizontally adjusting the rear end of said moldboard, substantially as described.

4. A plow comprising moldboards having universal connections with the plow at their forward ends and openings in the rear ends, standards horizontally adjustable on the plow-beam and having a series of openings in its vertical lower portion, a screw-threaded horizontal bar passing through the standards and the moldboards, nuts on said bar inside of the standards and clamping-nuts on each end of said bar, substantially as described.

5. A plow comprising a beam, a downwardly-projecting arm carried by said beam and having an opening therein, a plow-point adjacent the forward side of said arm, a transverse plate adjacent the rear side of said arm and having an opening in each end, a bolt passing through the plow-point, the opening in the arm and the transverse plate and securing the three parts together, and moldboards swiveled within the openings in the transverse plate, substantially as described.

In testimony whereof I have hereunto set my hand in the presence of two subscribing witnesses.

JAMES OSCAR DINKINS.

Witnesses:
H. H. BOONE,
L. HEGAR.